United States Patent [19]

Belongia et al.

[11] Patent Number: 5,002,841
[45] Date of Patent: Mar. 26, 1991

[54] COMPOSITE END BLOCK FOR A BATTERY

[75] Inventors: David C. Belongia, Oak Creek; Jeffrey P. Zagrodnik, Hales Corners; James J. Bolstad, Shorewood; Michael D. Eskra, Fredonia, all of Wis.

[73] Assignee: Globe-Union Inc., Milwaukee, Wis.

[21] Appl. No.: 463,273

[22] Filed: Jan. 10, 1990

[51] Int. Cl.⁵ .............................................. H01M 2/40
[52] U.S. Cl. ........................................ 429/70; 429/152
[58] Field of Search .................... 429/152, 70, 37, 38, 429/39, 34

[56] References Cited

U.S. PATENT DOCUMENTS

| | | | |
|---|---|---|---|
| 3,833,424 | 9/1974 | Louis et al. | 429/38 |
| 4,689,280 | 8/1987 | Gionfriddo | 429/39 |
| 4,818,639 | 4/1989 | Kunz | 429/34 |
| 4,826,741 | 5/1989 | Aldhart et al. | 429/34 |

Primary Examiner—Donald L. Walton
Attorney, Agent, or Firm—Foley & Lardner

[57] ABSTRACT

A light weight deflection-resistant end block is provided for a battery and comprises a base member of a light weight, chemically inert and electrically resistive material which has one or more cavities adapted to receive low density, substantially rigid inserts such as honey-combed aluminum.

23 Claims, 2 Drawing Sheets

COMPOSITE END BLOCK FOR A BATTERY

BACKGROUND OF THE INVENTION

1. Field of the Invention

This invention relates generally to an end block for a battery and, more particularly, to an end block with a composite structure having a low density, high strength core enveloped by a light weight inert material.

2. Description of the Prior Art

Electrochemical cells utilizing bipolar cell designs having reactive electrodes are well known. Conventional flowing electrolyte bipolar batteries are typically comprised of "stack" of cells, an electrolyte pump, an electrolyte reservoir, a cooling element, and external studs in electrical communication with the terminal electrodes. Each cell is comprised of an electrode upon which the anodic reaction takes place and an electrode upon which the cathodic reaction takes place.

In a typical bipolar battery, each electrode comprises two "poles", such that the anodic reaction occurs on one side of the electrode and the cathodic reaction occurs on the opposite side of the same electrode. Thus, in contrast to a monopolar battery, which requires two separate electrodes per cell, a bipolar battery is comprised of bipolar electrodes upon which both the anodic and cathodic reactions occur. As with a monopolar battery, the cells in a bipolar battery are electronically connected in series. Unlike a monopolar battery, where the cells are hydraulically isolated, the cells of a flowing electrolyte bipolar battery are hydraulically connected in parallel. Application Ser. No. 189,363 filed May 2, 1988, now abandoned entitled "Terminal Electrode" and having the same assignee as the present application, describes the current flow and structure of a bipolar battery of the zinc-bromine type and is incorporated by way of reference herein for such detail.

Generally, however, flowing electrolyte bipolar batteries require, in addition to cell stack components, electrolyte manifolds and fluid anolyte/catholyte pumps, and end blocks at each end of the battery which sandwich the cell stack therebetween. The end blocks serve as a supporting structure for the cell stack and provide the framework for duct and shunt tunnels to communicate with interiorly disposed elements of the battery. Additionally, the blocks support the various terminal studs which electrically communicate with the end or terminal electrodes of the cell stack. Not only must the blocks necessarily be inert relative to the various chemical constituencies comprising the fluid anolyte/catholyte, it is important that end blocks resist bending or bowing caused primarily by the different pressures which exist between the atmosphere and internal operating environments of the battery. For example, in a zinc-bromine battery environment, operating pressures may reach 15 pounds per square inch. Bowing of end plates may result in nonuniform electrolyte distribution in end cells. Nonuniform flow distribution may then cause a significant reduction in voltage and/or discharge capacity during discharge in, those cells relative to other cells.

Additionally, in zinc-bromine batteries, bowing of end blocks may result in poor zinc plating at the other end cell causing undesirable dendritic zinc growth to occur through the pore structure of the separator of the adjacent end cell. If dendritic growth reaches a cathode surface, it would provide a short circuit for current in that cell and eliminate its voltage contribution.

Various attempts have been made in the prior art to provide end plates which minimize bowing and resulting problems. For example, steel plates coated with an inert plastic material have been employed as end blocks largely at the sacrifice of another important consideration, namely weight. Still other attempts have considered the use of plastic materials ribbed in various patterns to provide additional strength to withstand the internal operating pressures to provide the required rigidity. It is often necessary, however, to have ribs which may approach a thickness of nearly an inch, resulting in an unnecessary increase in the overall volume of the assembly.

SUMMARY OF THE INVENTION

A light weight, deflection-resistant end block for a battery comprising a base member made of a light weight, chemically inert and electrically resistive material which has one or more cavities for housing low density, substantially rigid inserts such as honeycombed aluminum. The inserts are encapsulated by a cover welded or otherwise secured to the walls of the base member defining the cavities. The base member may also extend beyond the walls to provide a means for receiving the various ducts carrying the flowing electrolyte to and from the interior of the battery, thereby isolating the inserts from possible exposure to the electrolyte.

BRIEF DESCRIPTION OF THE DRAWING

A preferred exemplary embodiment of a composite end block in accordance with the present invention will hereinafter be described in conjunction with the appended drawing, wherein like designations denote like elements, and.

DETAILED DESCRIPTION OF EXEMPLARY EMBODIMENTS

Figures 1, 4:
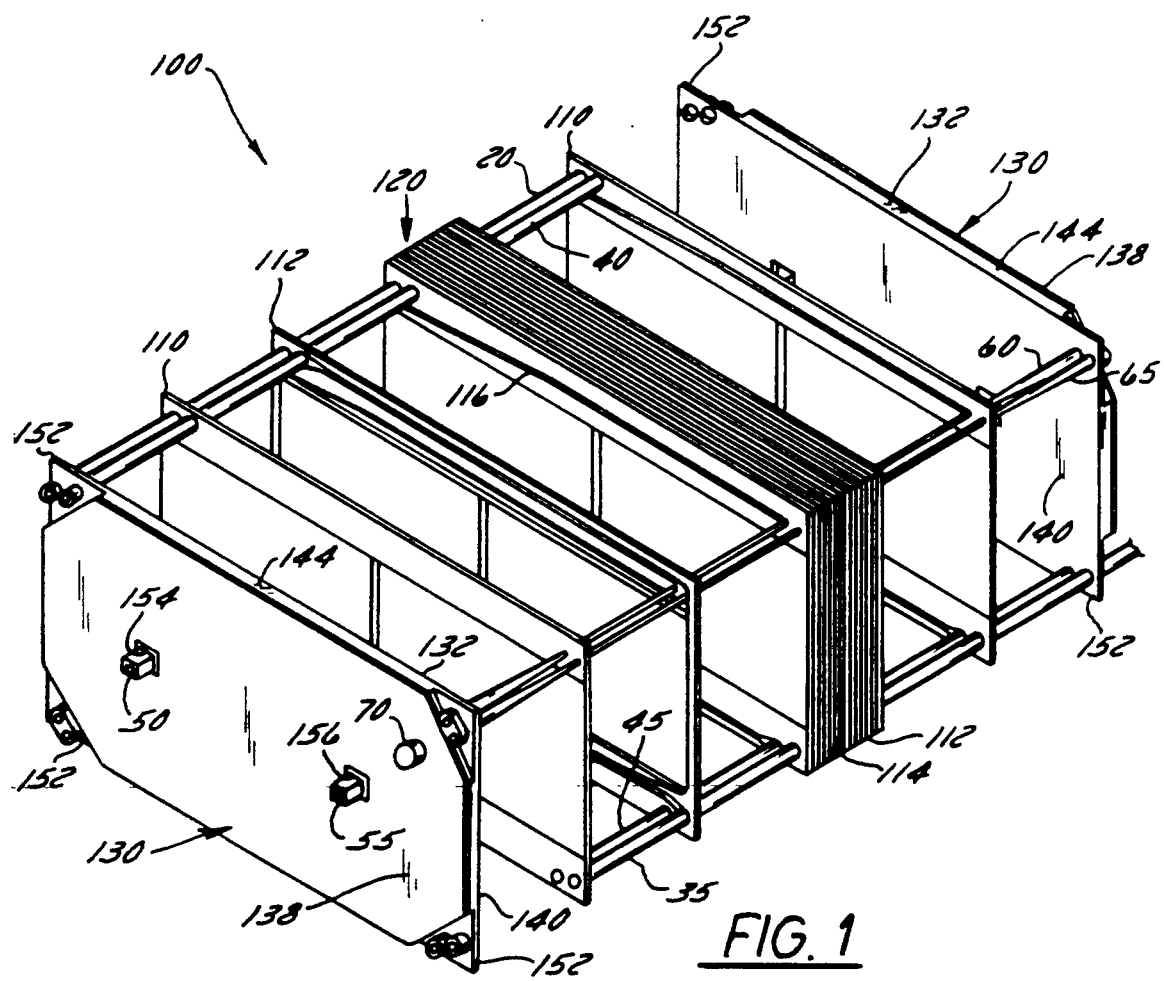
FIG. 1 is a perspective view of the various components of a bipolar battery sandwiched between a pair of end blocks in accordance with the present invention.
FIG. 4 is a back view of an assembled end block as shown in FIG. 2.

Referring to FIG. 1, bipolar battery 100 comprises a pair of end blocks 130, in accordance with the present invention, disposed exterior to a series of alternating separators 112 and electrodes 114, and sealed together to form a stack 120 of electrochemical cells. A pair of terminal electrodes 110 are shown separated from end blocks 130 and stack 120.

To provide the aqueous anolyte and catholyte to the respective half cells, anolyte and catholyte inlet ducts 35 and 20, respectively, and respective anolyte and catholyte discharge ducts 45 and 40 are positioned to facilitate passage of the aqueous anolyte and catholyte. Channels 116 are provided on each side of electrodes 114 or separators 112 as desired for the proper flow of the fluid electrolyte. The various details involving the structures of the various internal components and movement of the aqueous anolyte and catholyte are not necessary for understanding of the present invention but may be found in the aforementioned application Ser. No. 189,363. The technique of fabricating electrodes with the desired surface configurations for the appropriate flow of the aqueous electrolyte is disclosed in commonly assigned application Ser. No. 247,035 entitled "Friction Welded Battery Component and Method", filed Sept. 20, 1988, now U.S. Pat. No. 4,945,019 which is incorporated by way of reference herein.

Battery 100 is further provided with a pair of shunt tunnels 60 and 65 and preferably a removable shunt terminal 70 which helps minimize the effect of parasitic currents which often plague bipolar batteries of the zinc-bromine type. Commonly assigned application Ser. No. 241,714 entitled "Removable Protective Electrode in a Bipolar Battery", filed Sept. 8, 1988, now U.S. Pat. No. 4,929,325 sets forth in detail such a removable terminal 70 and is therefore incorporated by way of reference herein.

Figure 2:
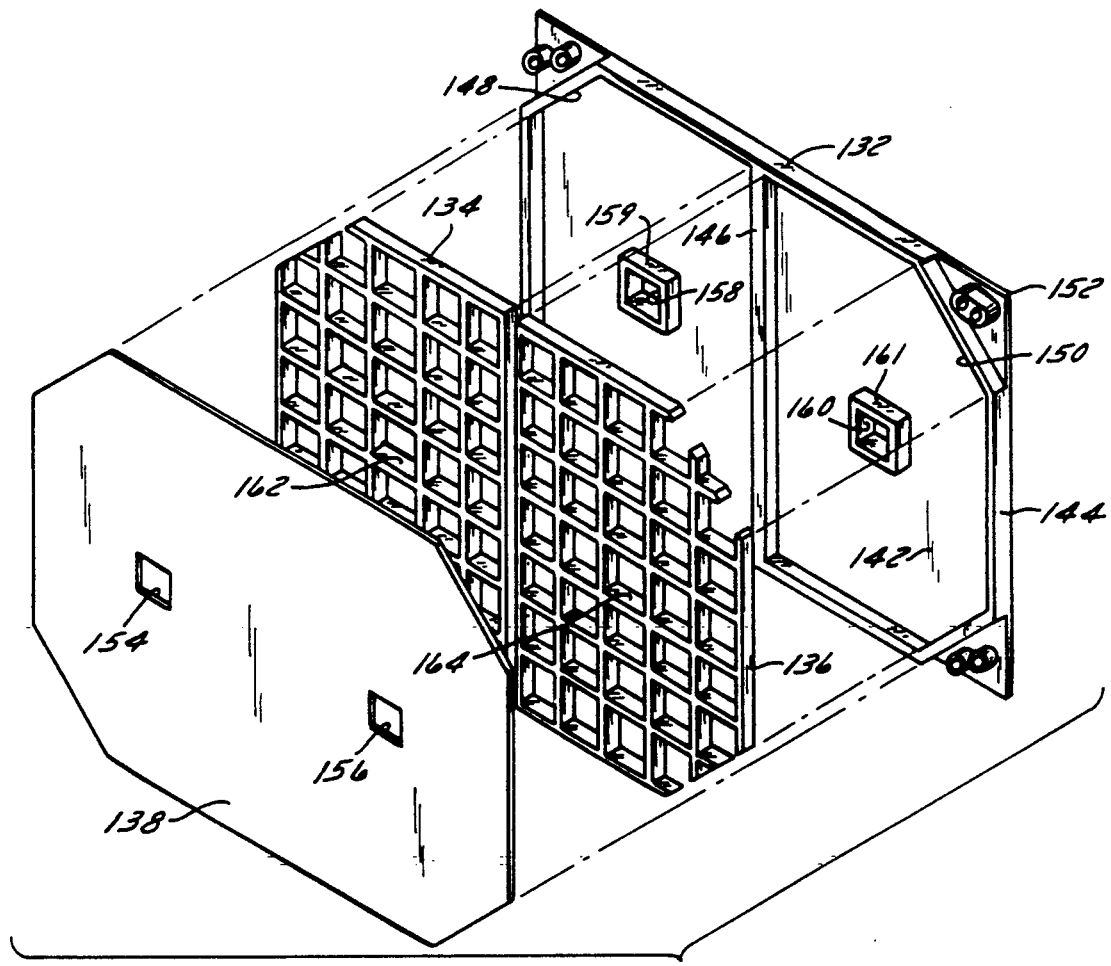
FIG. 2 is an exploded perspective of an end block in accordance with the present invention.
Figure 3:
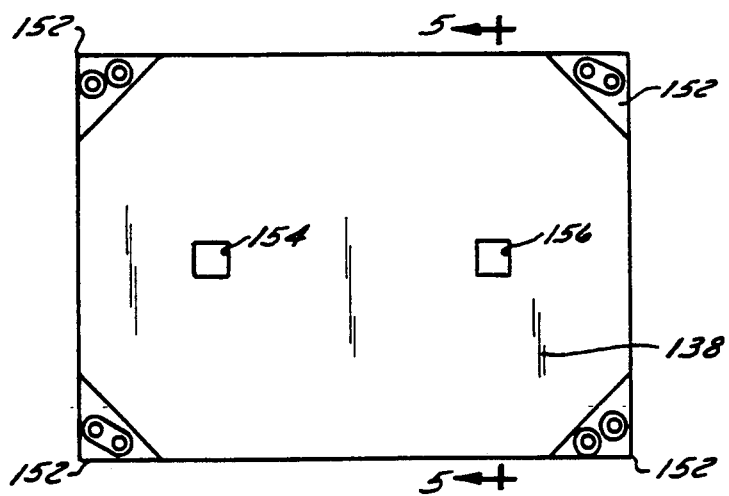
FIG. 3 is a front view of an assembled end block as shown in FIG. 2.
Figure 5:
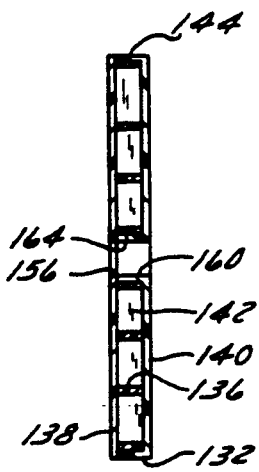
FIG. 5 is a sectional view of an end block taken along line 5—5 of FIG. 3.

Referring now to FIG. 2, end block 130 is depicted in exploded perspective with the three major parts thereof separated: a base member 132, a pair of end block inserts 134 and 136, and cover 138. Base member 132 is essentially a thin planar member having a first "major surface" 140, as seen in FIG. 4. On the opposite side, a second "major surface" 142 is seen in FIGS. 2 and 5. A "major surface" may be defined as those surfaces on a flat object having the greatest area as opposed to the relatively small areas on the connecting sides. Major surface 140 is essentially flat while major surface 142 is totally circumscribed by a wall 144 projecting outwardly from surface 142 except for corners 152. A dividing wall 146 essentially bisects the area on surface 142 within the perimeters of wall 144 such that wall 146, together with wall 144 and surface 142, define a pair of cavities 148 and 150. Wall 146, which may have a width of about 0.5 inches, acts as a reinforcing rib to provide desired rigidity to base 132 and end block 130.

Inserts 134 and 136 are housed within and have configurations complimentary to the dimensions of respective cavities 148 and 150. To facilitate complete enclosure, i.e. encapsulation, of inserts 134 and 136, walls 144 and 146 preferably extend outward from major surface 142 a distance equal to or slightly greater than the thickness of inserts 134 and 136.

Flat cover member 138 has a configuration which is preferably substantially identical to that defined by the outside edge of wall 144. Thus, respective corners 152 of base member 132 remain exposed even after cover 138 is positioned on and secured to wall 144, thereby encapsulating inserts 134 and 136. As best seen in FIG. 1, corners 152 serve as the supporting structure for the various anolyte/catholyte ducts and shunt tunnels. Additionally, as will become more apparent from the ensuing description, by providing corners 152 separated by wall 144 from cavities 148 and 150, inserts 134 and 136 are completely isolated from the electrolyte ducts and tunnels. This provides a further safeguard against any contact by the fluid electrolyte with the material comprising the inserts.

As described in referenced application Ser. No. 189,163, the number of studs extending from terminal electrode 120 is a matter of choice. In the embodiment of FIG. 1, two rectangularly shaped studs 50 and 55 are shown extending through each block 130. As seen in FIG. 2, each component of end block 130 is provided with a pair of openings through which respective studs 50 and 55 may extend when the components thereof are assembled. Base member 132 has a pair of rectangular shaped openings 158 and 160 circumscribed by respective rectangular shaped extensions or protrusions 159, 161 extending outward from major surface 142 centrally located within respective cavities 148 and 150. Complimentary openings 162 and 164 are formed within respective inserts 134, 136 such that protrusions 159 and 161 extend therethrough in a snug fit relationship. Protrusions 159 and 161 thus serve to electrically insulate studs 50 and 55 from inserts 134 and 136. The length of the extension of protrusions 159, 161 should be about the same or slightly greater than the thickness of inserts 134, 136, i.e. about the same as the extension of wall 144 and 146, such that the top surface of each protrusion abuts cover 138 about complimentary openings 154, 156 formed in cover 138.

Base member 132 and cover 138 are preferably fabricated from polyethylene, although other polyolefins such as polypropylene or polyolefin copolymers may be used as well. Various fillers and reinforcers may be incorporated into the selected material to increase its strength. Fillers may be selected from any compatible materials, such as, for example, glass fibers, glass beads, or titanium dioxide. It has been determined that fillers up to about forty percent by weight of the selected material may be used without detrimentally affecting other desired characteristics of the base and cover.

Inserts 134 and 136 are fabricated from low density materials, for example, less than 8 pounds per cubic foot, having significant resistance to bending over the longest "linear dimension" of the end block. The term "linear dimension" is defined herein to mean the length or width measured along major surface 132 of the end block. A preferred material is honey-combed aluminum laminated on either side with aluminum sheet, commercially available under the registered trademark Hexcel, from the Hexcel Company. Other materials having a density and weight approaching that of aluminum may also be utilized so long as the combined resistance against bending of the composite comprising end block 130 limits bending to less than about 0.005" under internal pressures within said battery of about 12 to 15 psi. For example, certain other materials like polyurethane, polypropylene, polyethylene, ceramics and graphite may also be employed.

Both base 132 and cover 138 are preferably made through an injection molding process, although compression molding techniques may be employed as well. Once base 132 is formed, inserts 134, 136 may be placed within respective cavities 148, 150. Cover 138 then is positioned in place and friction welded to the abutting parts of base 132. In fabrication of base 132 and cover 138, a weld bead (not shown) flanked by two flash traps may be positioned about the circumference of cover 138 or, alternatively, on wall 144 to facilitate friction welding of cover 138 to base 132. Additionally, a weld line (not shown) may extend down wall 146 and a weld seal (not shown) about the cover abutting the top surfaces of protrusions 159, 161 may be used to provide additional support against bending.

When assembling battery 100, major surface 140 of each end block 130 faces inwardly toward the various battery components. As described in the previously referenced application Ser. No. 247,035, each substrate of the various battery components is made from a material such as polethylene, polypropylene, other polyolefins, or copolymers thereof, such that the components may be friction welded together about the entire peripheries thereof thereby forming an integral structure. Similarly, the end blocks of the present invention may each be friction welded along the periphery of major surface 140 to an adjacent terminal electrode 110 to again provide the desired integral structural frame.

Thus, it is apparent that there has been provided, in accordance with the invention, a composite end block for use in a battery that fully satisfies the aims and advantages set forth above. While the invention has been fully described in conjunction with specific embodiments thereof, it is evident that many alternatives, modifications, and variations will be apparent to those skilled in the art. Accordingly, it is intended to embrace all such alternatives, modifications and variations as fall within the spirit and scope of the appended claims.

We claim:

1. A composite end block for use in a battery comprising:
   (a) a base member having a cavity therein, said base member fabricated from a plastic material;
   (b) an insert member disposed in said cavity;
   (c) a cover member secured to said base member so as to entirely encapsulate said insert member, said end block having a rigidity which limits bending of said end block to less than about 0.005 inches along the longest linear dimension of said end block under an internal pressure within said battery of about 12–15 psi.

2. The end block according to claim 1 in which said base member is fabricated from a material selected from a group consisting of polyolefin, polyethylene, polypropylene, other polyolefins, or copolymer thereof.

3. The end block according to claim 2 in which said base material is polyethylene.

4. The end block according to claim 1 in which said base member contains a filler of up to forty percent by weight of material selected from a group consisting of glass fiber, glass beads, and titanium dioxide.

5. The end block according to claim 1 in which said insert member is fabricated from a material selected from a group consisting of aluminum, polyethylene, polypropylene, polyurethane, ceramic and graphite.

6. The end block according to claim 5 in which said insert material is fabricated from aluminum.

7. The end block according to claim 6 in which insert comprises aluminum in a honey-combed configuration.

8. The end block according to claim 1 including a pair of inserts, said base member having a pair of cavities with said inserts disposed therein.

9. The end block according to claim 8 in which said cavities are separated by a wall.

10. In a battery having a plurality of ducts for carrying aqueous electrolyte and tunnels for shunting parasitic current, a pair of end blocks and a plurality of separators and electrodes sandwiched therebetween, said end blocks each having a rigidity which limits bending to less than about 0.005" along the longest linear dimension of said end block and comprising:
   (a) a planar base member having an essentially flat first major surface on one side and a first wall protruding out from a second surface on an opposite side, said wall together with said second surface defining a cavity;
   (b) an insert member positioned in said cavity; and
   (c) a cover secured to said wall and together with said base member encapsulating said insert member.

11. The battery according to claim 10 in which said base member has a second wall extending out from said second surface and essentially bisecting said cavity into first and second smaller cavities, said insert member comprising a pair of insert elements each positioned in said respective smaller cavities.

12. The battery according to claim 10 in which said base member is fabricated from a material selected from a group consisting of polyethylene, polypropylene, other polyolefins, or copolymers thereof.

13. The battery according to claim 12 in which said material is polyethylene.

14. The battery according to claim 12 in which said material contains a reinforcing filler selected from the group consisting of glass fiber, glass beads, and titanium dioxide.

15. The battery according to claim 14 in which said filler is equal to or less than about 40% by weight of said base member.

16. The battery according to claim 10 in which said insert is fabricated from a material having a density less than about 8 pounds per cubic foot.

17. The battery of claim 16 in which said insert is aluminum in a honey-combed configuration.

18. The battery according to claim 11 in which said material is selected from a group consisting of polyethylene, polypropylene, polyurethane, ceramic and graphite.

19. The battery according to claim 18 in which said material is polyolefin.

20. A composite end block for use in a battery having a plurality of ducts carrying fluid electrolyte comprising:
   a base member having first and second major surfaces, said second major surface having a first predetermined region enclosed by a continuous wall and a plurality of separated second regions outside of said continuous wall, said continuous wall and said second major surface defining at least one cavity;
   at least one insert housed within said cavity; and
   a cover member abutting said wall such that said second major surface, said wall and said cover collectively encapsulate said insert, said separated regions of said second major surface having openings adapted to receive said electrolyte ducts.

21. The composite end block according to claim 20 wherein a dividing wall extends across said first predetermined region such that said continuous wall, said dividing wall, and said second major surface define two cavities, said end block further having a pair of inserts each housed in respective cavities.

22. The end block according to claim 20 in which said inserts and said respective cavities have complimentary peripheries.

23. The end block according to claim 20 in which each of said base member, said insert, and said cover is provided with at least one opening adapted to receive a stud extending from a terminal electrode within said battery through said end block exterior of said cover, said base member opening being defined by a protrusion extending from said second major surface through said opening of said insert to a position and abutting said cover about said cover opening therein.

* * * * *